US006047609A

United States Patent [19]

Brower et al.

[11] Patent Number: 6,047,609

[45] Date of Patent: Apr. 11, 2000

[54] REMOTE CONTROL MECHANISM

[75] Inventors: David R. Brower, Fond du Lac; Larry A. Floeter, Campbellsport; Gary G. Gilbertson, Fond du Lac, all of Wis.

[73] Assignee: Brunswick Corporation, Lake Forest, Ill.

[21] Appl. No.: 09/148,356

[22] Filed: Sep. 4, 1998

[51] Int. Cl.[7] .................................................... B60K 41/04

[52] U.S. Cl. ........................ 74/473.19; 74/480 R; 440/86

[58] Field of Search .............................. 74/473.19, 473.2, 74/473.21, 480 R; 440/86

[56] References Cited

U.S. PATENT DOCUMENTS

| | | | |
|---|---|---|---|
| Re. 31,861 | 4/1985 | Prince | 192/0.096 |
| 3,241,640 | 3/1966 | McCordic et al. | 74/480 R X |
| 3,824,879 | 7/1974 | Hansgen et al. | 74/473.19 X |
| 3,902,378 | 9/1975 | Osborn | 74/473.19 X |
| 4,090,598 | 5/1978 | Prince | 192/0.096 |
| 4,470,492 | 9/1984 | Kobelt | 74/473.19 X |
| 4,491,209 | 1/1985 | Bening | 74/480 R X |
| 4,632,232 | 12/1986 | Kolb | 192/0.096 |
| 4,641,545 | 2/1987 | Rabe | 74/473.19 X |
| 4,753,618 | 6/1988 | Entringer | 440/86 |
| 4,838,822 | 6/1989 | Friedle et al. | 74/473.19 X |
| 5,062,516 | 11/1991 | Prince | 192/0.096 |
| 5,228,548 | 7/1993 | Bohlin | 74/473.19 X |
| 5,492,493 | 2/1996 | Ohkota | 440/86 |

*Primary Examiner*—Khoi Q. Ta
*Attorney, Agent, or Firm*—William D. Lanyi

[57] ABSTRACT

A remote control mechanism is provided with a cam mechanism that allows an operator of a marine vessel or other type of apparatus to move a handle along a generally linear path to simultaneously select the gear selection and throttle selection for the marine vessel. Cam mechanisms within a support structure translate the linear motion of the handle into preselected motions that cause first and second actuators to affect first and second parameters of the propulsion system. Cam followers attached to a control member are moved in coordination with the handle movement to cause first and second cam tracks to rotate about pivot points relative to the support structure. This rotation of the first and second cam tracks causes first and second actuators to be moved. The actuators, which can be cables, are also connected to selectors of both gear position and throttle position.

19 Claims, 5 Drawing Sheets

REMOTE CONTROL MECHANISM

BACKGROUND OF THE INVENTION

1. Field of the Invention

The present invention is generally related to a remote control mechanism and, more particularly, to a remote control mechanism that uses a single sliding lever to control both gear and throttle selections.

2. Description of the Prior Art

Many different types of single lever remote control mechanisms are known to those skilled in the art. These devices find particular utility in marine propulsion systems which use either outboard motors, inboard drives, or stern drives.

U.S. Pat. No. 4,090,598, which issued to Prince on May 23, 1978, discloses a single lever remote control system for the throttle and clutch of a marine propulsion system. It includes a housing typically supporting a shaft member for relative lateral or axial movement between first and second positions. It also comprises a main control lever which is connected to the shaft member for common axial movement and for common rotary movement from a neutral position. The control system also includes a throttle drive member connected to the shaft member for common rotary movement and for relative axial movement of the shaft member. The system includes a clutch shift drive member that is mounted on the shaft member for relative rotation and for common axial movement. The clutch shift drive member includes a drive lug which, when the shaft member is in the first position, is receivable in and drivingly engages a drive notch in the throttle drive member to provide common rotary movement of these two members in response to pivotal movement of the main control lever from the neutral position. When the shaft member is moved axially to the second position in response to outwardly lateral or axial movement of the main control lever, the clutch shift drive member is moved to a disengaged position wherein the throttle drive member can be rotated or pivoted relative to the clutch shift drive member by the main control lever so that the engine throttle can be operated independently of the clutch for engine warm-up.

U.S. Pat. No. Re.31,861, which has been reissued to Prince on Apr. 9, 1985, describes a single lever remote control for engine throttle and clutch. The throttle control for an engine includes a housing supporting a control lever for rotation relative to a neutral position, a throttle lever moveably mounted on the housing and adapted to actuate the engine throttle, a throttle drive member including a drive pin and mounted for rotation in response to movement of the control lever from the neutral position, and a cam member connected between the throttle lever and the throttle drive member. The cam member includes a cam track receiving the drive pin and having a shape effective to displace the cam member relative to the throttle drive member, transversely relative to the rotational axis of the throttle drive member, so as to move the throttle lever in response to rotation of the throttle drive member. In one embodiment, the control further includes a shift lever moveably mounted on the housing and adapted to actuate the engine clutch and a shift drive member drivingly connected to the shift lever for actuating the engine clutch in response to movement of the control lever from the neutral position. The cam track is arranged so that the cam member, and thus the throttle lever, remains in an engine idle position during initial movement of the control lever from the neutral position to actuate the engine clutch and so that further movement of the control lever from the neutral position causes translatory movement of the cam member to advance the engine throttle.

U.S. Pat. No. 4,632,232, which issued to Kolb et al on Dec. 30, 1986, discloses a single lever remote control throttle dwell and friction mechanism. The single lever control for operating the clutch and throttle of a marine motor has a support on which a sleeve is mounted on a pivot. A rod is mounted in the sleeve for axial movement. The distal end of the rod is actuated to move the rod and the sleeve about the pivot and also to move the road axially relative to said sleeve. An actuating arm and a cam track cooperate to move the rod and sleeve in an arc above the pivot between first and second positions between which the clutch is operated by an operator actuated by rotation of the arm about its pivot. The actuating arm moves the rod axially relative to the sleeve when the arm is beyond the clutch operating range. The rod is connected to the throttle. A friction device acts on the rod to resist axial movement of the rod relative to the sleeve. The friction load resists change of the throttle setting, but has no affect on clutch operation.

U.S. Pat. No. 4,753,618, which issued to Entringer on Jun. 28, 1988, discloses a shift cable assembly for a marine drive. The shift cable assembly includes a shift plate, a shift lever pivotally mounted on the plate, and a switch actuating arm pivotally mounted on the plate between a first neutral position and a second switch actuating position. A control cable and drive cable interconnect the shift lever and switching actuating arm with a remote control and clutch and gear assembly for the marine drive so that shifting of the remote control by a boat operator moves the cable to pivot the shift lever and switch actuating arm which in turn actuates a shift interrupter switch mounted on the plate to momentarily interrupt ignition of the drive unit to permit easier shifting into forward, neutral, and reverse gears. A spring biases the arm into its neutral position and the arm includes an improved mounting for retaining the spring in its proper location on the arm.

U.S. Pat. No. 5,062,516, which issued to Prince on Nov. 5, 1991, describes a single lever control. The control comprises a housing, a control lever pivotally mounted on the housing and adapted to be operably connected to an engine throttle and to a clutch, a warning horn connected to the housing and adapted to be operably connected to an engine for providing a warning signal when an engine condition exceeds a predetermined value, a cover connected to the housing and adapted to be mounted on a generally flat mounting surface, the cover partially enclosing the housing and enclosing the warning horn, and an ignition switch mounted on the cover and adapted to be operably connected to an engine ignition system.

U.S. Pat. No. 5,492,493, which issued to Ohkita on Feb. 20, 1996, describes a remote control device for a marine propulsion unit. The device is intended to control the operation of a transmission and throttle control for a marine propulsion system that is operated by a single control lever. The single control lever's position is sensed and a single servomotor is operated which operates both the transmission control and throttle control through a cam and follower mechanism. A warm-up control is also incorporated that permits partial opening of the throttle for warm-up operation.

Most known types of remote control mechanisms for marine propulsion systems utilize a lever that rotates about a pivot point to allow an operator of a marine vessel to rotate about its pivot point to affect changes in the transmission and/or throttle setting of an outboard motor, inboard propulsion system, or stern drive propulsion system. To provide added convenience for the marine vessel operator, there are many types of remote control systems that also use a single lever which simultaneously controls both the transmission and the throttle setting of the marine propulsion system.

It would be beneficial if a remote control system could be developed which performs the simultaneous functions of selecting the transmission setting and throttle setting and which incorporates a sliding control handle which moves along a generally linear path rather than in an arc as required when a lever control is used.

SUMMARY OF THE INVENTION

A remote control mechanism made in accordance with the present invention comprises a support structure, which can generally be a housing within which the moving parts of the mechanism are enclosed. It also comprises a control member which is moveable relative to the support structure. The control member comprises a lever which allows the operator to move the control member relative to the support structure to affect one or more operating parameters of an engine, such as the transmission setting or the throttle setting. A preferred embodiment of the present invention further comprises a first cam track which is rotatable about a first axis relative to the support structure. In a typical application, the first cam track is pivotable about the first axis at a pivot point within the support structure. The preferred embodiment further comprises a first cam follower which is attached to the control and moveable with the handle. The first cam follower is moveable along the first path and is contained within the first cam track. A preferred embodiment of the present invention also comprises a first actuator for affecting a first parameter of the drive system. The first actuator can be attached for movement with the first cam track relative to the support structure in response to rotation of the first cam track relative to the support structure. As a result, movement of the control member or handle, relative to the support structure, moves the first cam follower along the first path which also causes the first cam follower to move relative to the first cam track. As a result, it rotates relative to the support structure to move the first actuator relative to the support structure.

A particularly preferred embodiment of the present invention further comprises a second cam track which is rotatable about a second axis relative to the support structure. It also comprises a second cam follower attached to the control member which is moveable along a second path and contained within the second cam track. It should be understood that, in a particularly preferred embodiment of the present invention, the first and second cam followers are attached to the control member in such a way that they travel together and along paths which are actually parallel to each other. Typically, the first and second cam followers are wheels, or sliding blocks, which are attached to the control member to rotate about a common axis.

A preferred embodiment of the present invention also comprises a second actuator for affecting a second parameter of the engine. The second actuator is attached for movement with the second cam track relative to the support structure in response to rotation of the second cam track relative to the support structure. As a result, movement of the control member relative to the support structure moves the second cam follower along the second path which causes the second cam follower to move relative to the second cam track and thereby rotate relative to the support structure so that it moves the second actuator relative to the support structure.

In a typical application of the present invention, the first and second actuators are cables that are disposed within sheaths. One end of each cable is attached to rotate with its associated cam track. By moving the end of each cable relative to its respective sheath, the opposite end of each cable moves a selector located near the outboard motor, inboard engine, or stem drive unit. Typically, one of the actuators controls the transmission and the other actuator controls the throttle.

In a particularly preferred embodiment of the present invention, the first and second paths traveled by the first and second cam followers are linear. However, it should be understood that alternative embodiments of the present invention could result in non-linear paths.

As described above, the first and second cam tracks are rotatable about first and second axis to rotate or pivot relative to the support structure. It should be understood that in most applications of the present invention, the cam tracks are attached to pivotable members to accomplish these purposes. For example, the remote control mechanism of the present invention can further comprise a first pivotable member which is rotatable about a first axis relative to the support structure and the first cam track can be rigidly attached to the first pivotable member. The first actuator is then attached to the first pivotable member. A second pivotable member which is rotatable about a second axis relative to the support structure can also be provided and the second cam track can be rigidly attached to the second pivotable member. The second actuator is attached to the second pivotable member.

The first actuator is typically a first cable which has a first end attached to move with the first cam track and a second end attached to a gear shift mechanism of the engine. The first cable is disposed within a sheath which is attached to the support structure. The second actuator can be a second cable having a first end attached to move with the second cam track and a second end attached to a throttle mechanism of the engine. The second cable is disposed within its sheath which is also attached to the support structure.

One of the purposes of the present invention is to provide a control mechanism that has a control handle that moves along the linear path relative to a support structure. As such, a preferred embodiment of the present invention comprises a support structure and an control member which is moveable along the linear path relative to the support structure. A first cam mechanism is connected to the control member and to a first actuator for affecting a first parameter of an engine. As a result, movement of the control member relative to the support structure moves the first actuator relative to the support structure. In addition, the control mechanism of the present invention also comprises a second cam mechanism connecting to the control member and to a second actuator for affecting a second parameter of the engine. Movement of the control member relative to the support structure moves the second actuator relative to the support structure. The first parameter of the engine is a gear shift position and the second parameter of the engine is a throttle position.

In a particularly preferred embodiment of the present invention, the mechanism allows an operator to move a handle along a linear path rather than along an arcuate path as is required in known remote control mechanisms. Cam mechanisms are used to translate this linear motion into a motion within the structure of the remote control mechanism that causes one or more actuators to affect associated parameters of the engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1A:
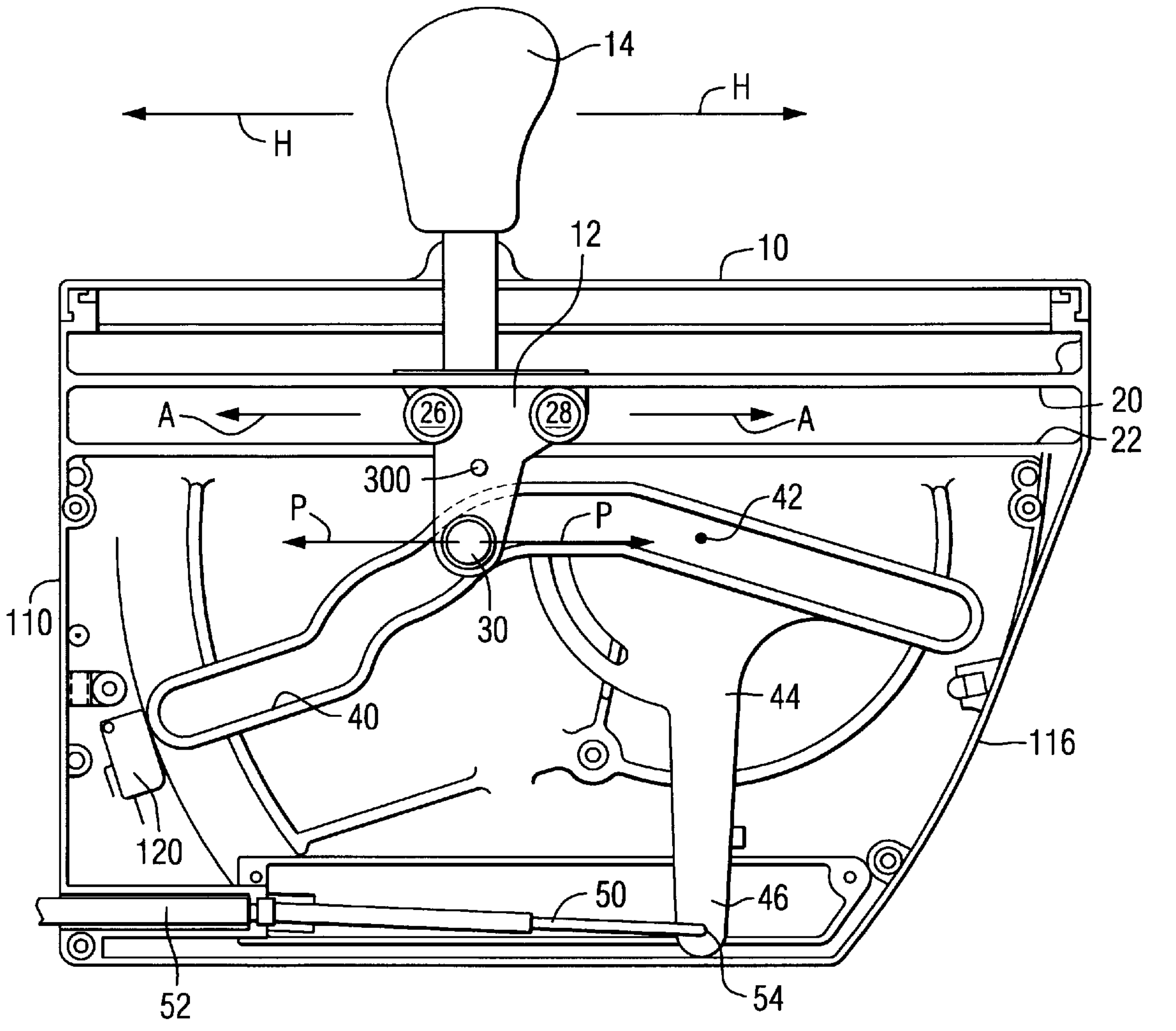
FIGS. 1A and 1B show two portions of a support structure with both first and second cam tracks and first and second cam followers illustrated therewith.

Throughout the description of the preferred embodiment, like components will be identified by like reference numerals.

Figure 1B:
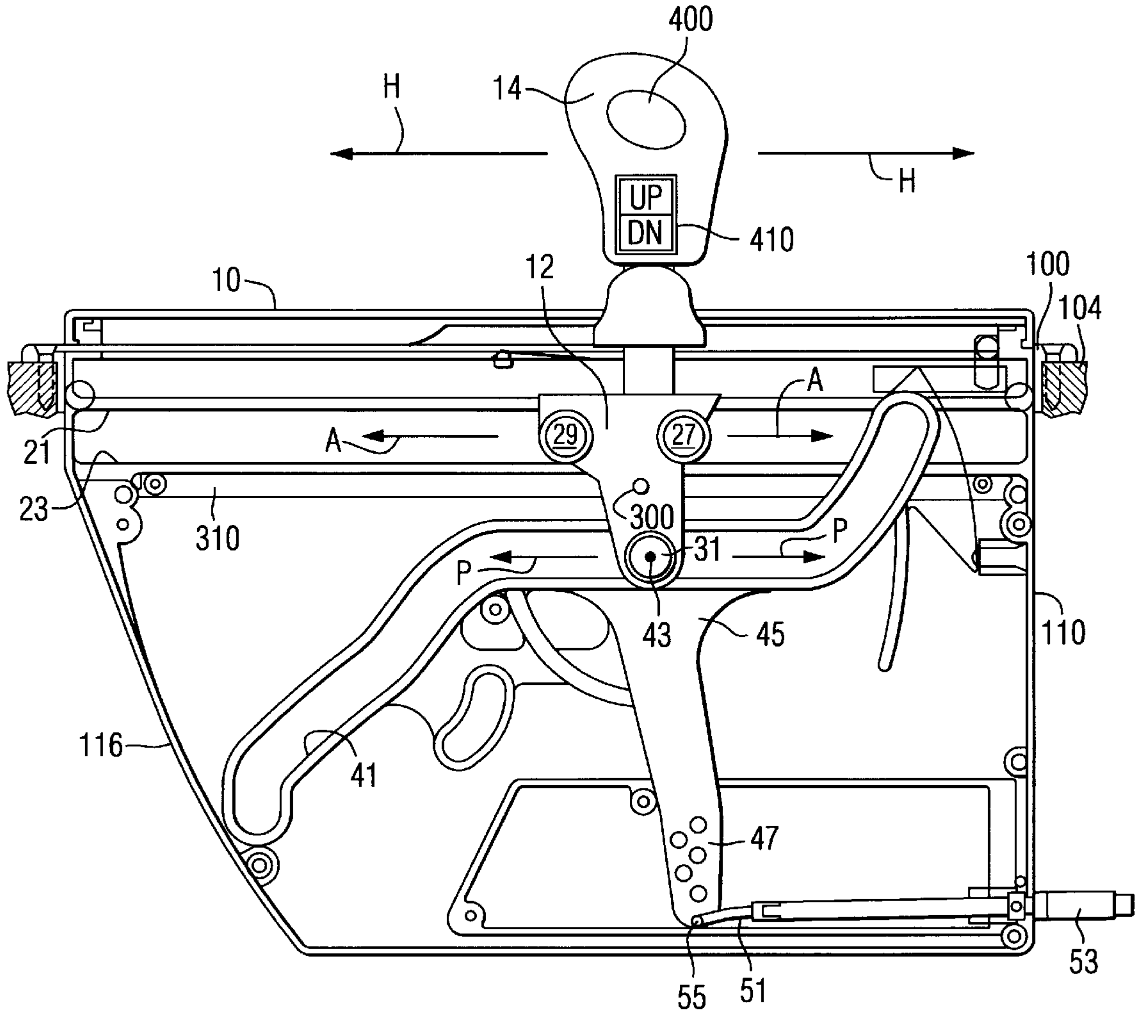

FIGS. 1A and 1B illustrate a preferred embodiment of the present invention which is disassembled to be shown in two views. In a typical application, the components illustrated in FIGS. 1A and 1B would be combined together to form a single remote control mechanism. In FIG. 1A, one half of a support structure 10 is shown with a control member 12 disposed for movement relative to the support structure 10. The control member 12 is attached to a handle 14 which allows an operator to move the control member 12 back and forth along a predetermined path which is represented by arrows A. Surfaces 20 and 22 confine the movement of wheels 26 and 28 along the path defined by arrows A.

A cam follower 30 is attached to the control member 12 and it moves along a path represented by arrows P in FIG. 1A. As the operator grips the handle 14 and moves the handle back and forth along path H, the cam follower 30 moves back and forth along a generally linear path in the directions indicated by arrows P.

A first cam track 40 is rotatable about a first axis 42 relative to the support structure 10. In FIG. 1A, the first cam track 40 is pivotable about point 42. Although not shown in the illustration, a generally cylindrical extension on the back side of the first cam track 40 is disposed around a protrusion extending from the wall of the support structure 10 at the location identified by reference numeral 42. It should be understood that when the first cam track 40 rotates about point 42, the first pivotable member 44, which is an integral portion of the cam track 40 in a preferred embodiment of the present invention, also pivots about point 42. This causes the arm 46 to pivot about point 42. A first actuator 50 is attached to the arm 46. In a typical application of the present invention, the first actuator 50 is a cable that is disposed within a sheath 52 and, as the arm 46 pivots about point 42, the cable is pushed into or pulled out of the sheath 52 in the manner that is generally known to those skilled in the art of control mechanisms.

Since the cam follower 30 is confined within the first cam track 40, movement of the cam follower along path P will force the first cam track 40 and the first pivotable member 44 to move in order to accommodate the movement of the first cam follower 30. This movement is confined in a manner that forces the first pivotable member 44 to rotate with the first cam track 40 about point 42. As a result, the rotation of the first pivotable member 44 causes the first actuator 50 to be moved as described above. In a typical application of the present invention, the first actuator comprises a cable with a first end 54 attached for rotation with the first cam track 40 and a second end (not shown in FIG. 1A) attached to a component on an engine which affects a first parameter of the engine, such as a gear shift mechanism.

FIG. 1B shows the other disassembled half of a preferred embodiment of the present invention. The mating half of the support structure 10 shown in FIG. 1A is illustrated in FIG. 1B. This mating half of the support structure 10 provides a confining track defined by surfaces 21 and 23 in which rollers 27 and 29 are free to roll in the directions represented by arrows A. It should be understood, that in a preferred embodiment of the present invention, wheels 26 and 27 rotate about a common axis and wheels 28 and 29 rotate about a common axis. Those common axes extend through the control member 12. In addition, surfaces 20 and 21 and surfaces 22 and 23 are generally co-planar in a preferred embodiment. A second cam follower 31 is attached to the control member 12 for movement with the control member as it moves back and forth along path A. This causes the second cam follower 31 to move back and forth along path P. It can be seen, from viewing FIGS. 1A and 1B, that the path of the first cam follower 30 and the path of the second cam follower 31 are parallel to each other and can be considered a common path for purposes of describing the operation of the present invention. It should also be understood that the first and second cam followers, 30 and 31, rotate about a common axis in a preferred embodiment of the present invention. That common axis extends through the control member 12.

With continued reference to FIG. 1B, it should be noted that the second cam track 41 is rotatable, about a second axis, relative to the support structure 10. That point of rotation is identified by reference numeral 43 in FIG. 1B. Although shown concentric with the axis of the second cam follower 31, it should be understood that pivot point 43 is fixed in FIG. 1B whereas the second cam follower 31 is free to move in conjunction with the movement of the control member 12. The second cam track 41 is part of a second pivotable member 45 which has an arm 47 attached to it. Therefore, when the second cam track 41 rotates about pivot point 43 in response to the generally linear movement of the second cam follower 31, the entire second pivotable member 45 rotates about point 43. This moves the arm 47. A second actuator 51 is disposed within a second sheath 53. The first end 55 of the second actuator 51 is attached to the arm 47 of the second pivotable member 45.

When an operator moves the handle 14 along path H, the control member 12 moves along path A and this movement carries the second cam follower 31 along path P. Since the second cam follower 31 is confined within the second cam track 41, the second pivotable member 45 is caused to rotate about point 43. This moves the arm 47 about point 43 and moves the cable of the second actuator 51 within the second sheath 53. A second end (not shown in FIG. 1B) of the second actuator 51 is connected to a throttle control of an engine.

With continued reference to FIG. 1B, it should also be noted that a bezel 100 is used to attach the support structure 10 to a portion 104 of a boat or other similar vehicle. Furthermore, when assembled together, edge 110 in FIG. 1B is aligned with edge 110 in FIG. 1A. Furthermore, edge 116 is FIG. 1B is aligned with edge 116 in FIG. 1A. The two halves of the support structure 10 are then fastened together to confine the control member 12 and both the first and second cam tracks, 40 and 41, within the support structure 10. It should be understood that, although the control member 12 and handle 14 are illustrated in both FIGS. 1A and 1B, only one control member 12 and one handle 14 are used in a preferred embodiment of the present invention. When the two halves of the support structure 10 are combined together to form a housing surrounding the moveable components, the first cam follower 30 is disposed within the first cam track 40 and the second cam follower 31 is disposed within the second cam track 41. The first and second cam followers are both attached to the control member 12 and move along paths P.

A neutral position switch 120 can be provided within the housing and attached to the support structure 10 as illustrated in FIG. 1A. When the first cam track 40 moves to a neutral position, an electrical signal can be provided by the neutral position switch 120.

With reference to FIGS. 1A and 1B, it can be seen that the first and second cam tracks 40 and 41, are shaped to define particular patterns. It should also be clearly understood that these particular patterns which are shown are not limiting to the present invention. Instead, it should be fully understood that the actual shapes of the first and second cam tracks, 40 and 41, can be altered to suit various applications in which the present invention is used. In fact, the variability of the shapes of the cam tracks represent one of the significant advantages of the present invention. The relationship between the movement of the first and second pivotable members, 44 and 45, relative to the movement of the handle 14 can be varied within a virtually infinite range of possibilities. For example, it may be desirable to have a relatively slow movement of the throttle actuator 51 in response to the initial movement of the handle 14 but, as the handle 14 moves further into the forward range, to have an increasing rate of movement of the throttle mechanism in response to that further movement of the handle 14. Whatever the desired relationship between the movement of either the gear or throttle mechanisms in response to the movement of the handle 14, that relationship can be accommodated by the present invention.

Figure 2:
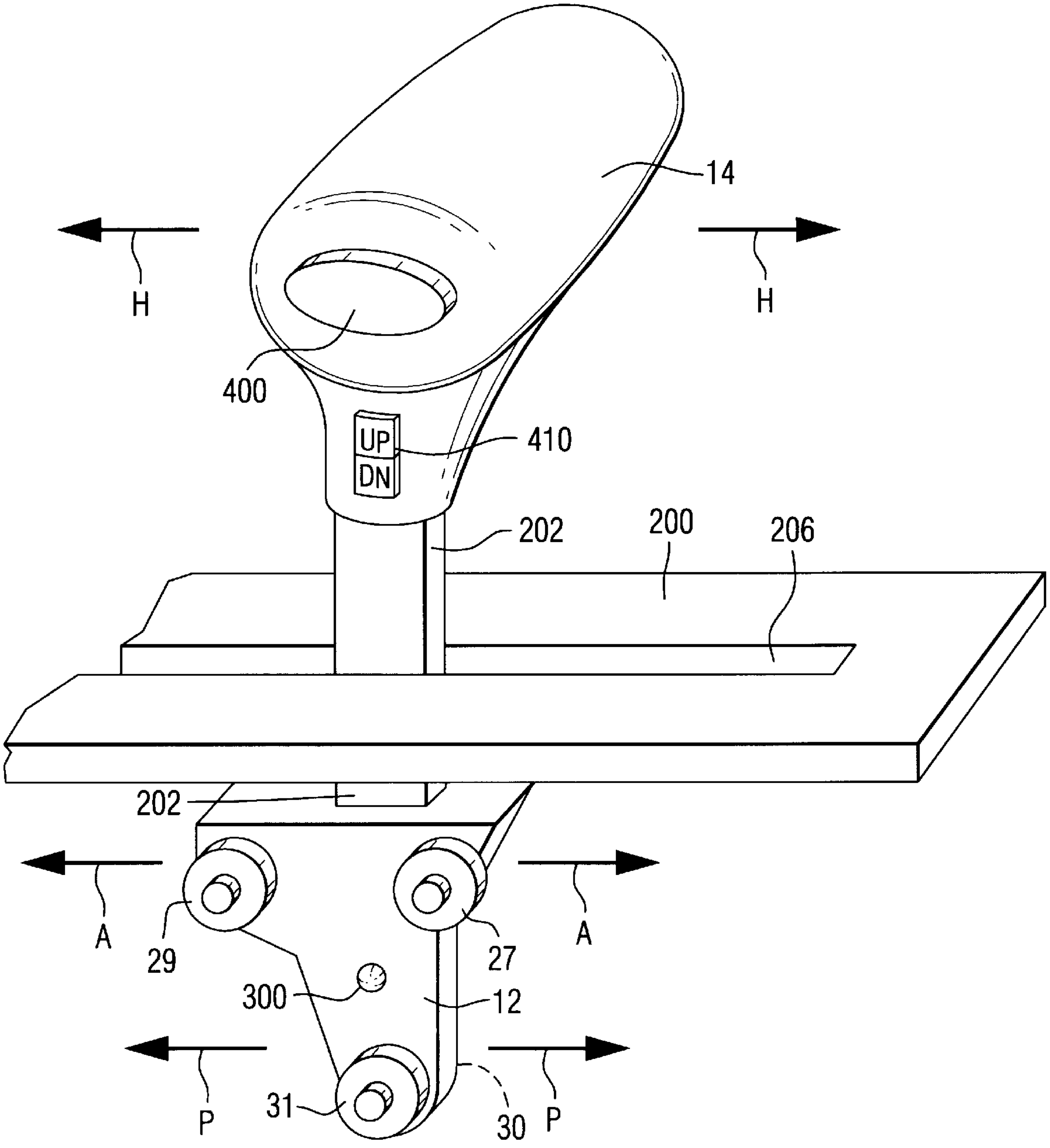
FIG. 2 is an isometric representation of a control member in conjunction with a control handle.

FIG. 2 shows an isometric view of the top surface 200 of the support structure 10 described above in conjunction with FIGS. 1A and 1B. The handle 14 is attached to a shaft 202 which extends through a slot 206 in the top surface 200. That shaft 202 is attached to the control member 12. In FIG. 2, wheels 27 and 29 are visible. It should be understood that wheels 26 and 28 also rotate about common axes with wheels 27 and 29, but are not visible in the view of FIG. 2. Furthermore, the second cam follower 31 is shown attached to the control member 12. It should be understood that the first cam follower 30 rotates about a common axis with the second cam follower 31, but is not shown in FIG. 2. However, reference numeral 30 and a dashed line represent the position of the first cam follower 30 behind the control member 12 in FIG. 2.

In order to understand the advantages of the present invention, it is important to understand how it works to perform its intended function. FIGS. 3A–3C and 4A–4C are provided for the purpose of describing the operation of the present invention. In the following description, it is important to understand that the specific shape of the second cam track 41 is not limiting to the present invention. Furthermore, it should be understood that many different shapes for both the first and second cam tracks are possible, depending on the intended performance of a marine vessel using the present invention. Also, the motion of the handle need not be linear in all embodiments of the present invention. The handle's shape is also not limited to that shown in the figures.

Figure 3A:
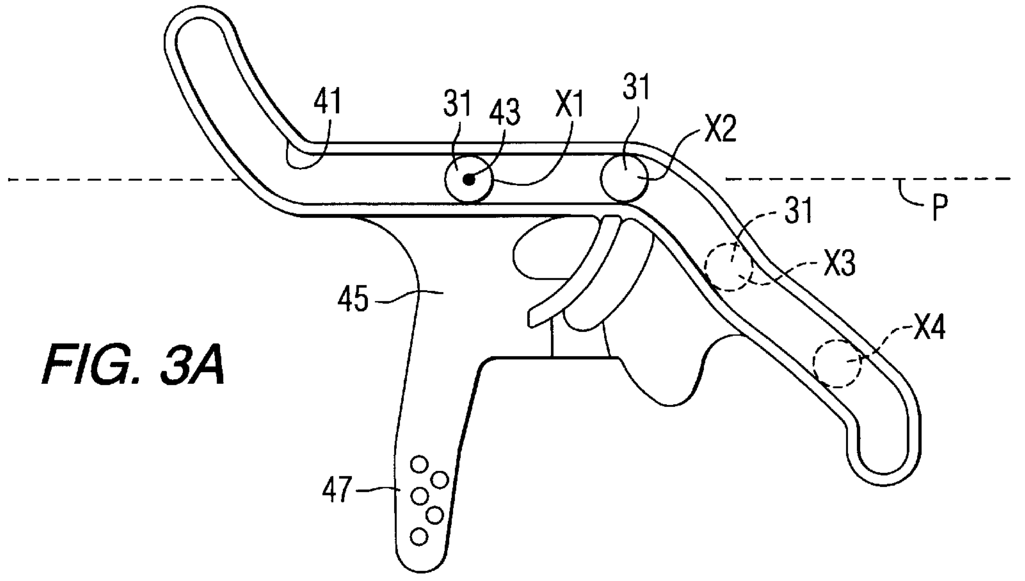
FIGS. 3A, 3B, 3C show the relationship between the cam follower and cam track to control throttle setting when the mechanism is operated in forward gear.

In FIG. 3A, the second cam follower 31 is disposed at a position identified as X1 in the cam track 41. As described above, the second cam follower 31 must always travel along the path P identified by a dashed line in FIG. 3A. Therefore, it can be seen that as the second cam follower 31 moves from point X1 to point X2, no rotation of the second pivotable member 45 is required. This defines a range of travel, from neutral into forward gear, by the handle 14 during which no increase in throttle results. This may be a desirable relationship between movement of the handle 14 and the resulting actual increase in engine speed. It can be seen in FIG. 3A that the second cam follower 31 can not move from position X2 to position X3 without some movement of the second pivotable member 45 to accommodate the requirement that the second cam follower 31 remain in the second cam track 41. For that reason, position X3 is represented by a dashed outline of the second cam follower 31 in FIG. 3A.

Figure 3B:
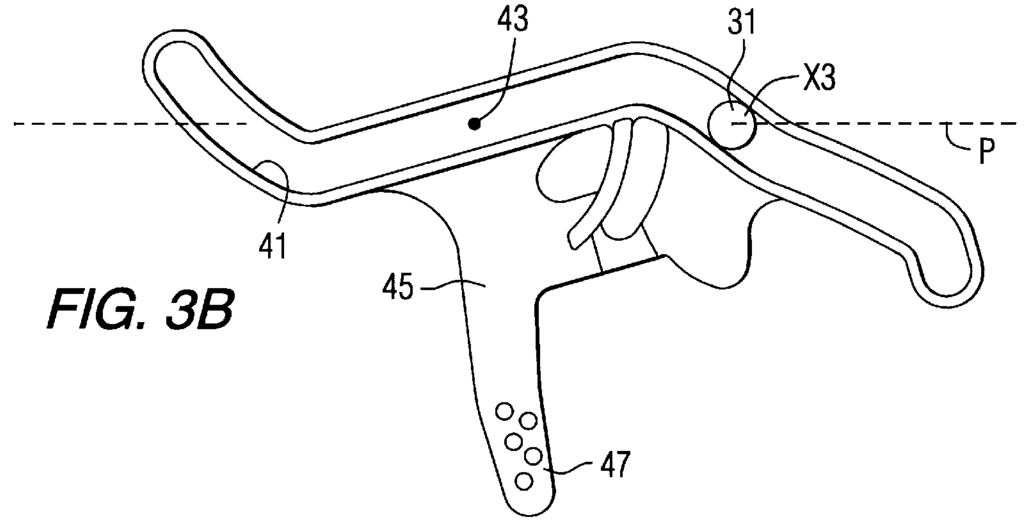
Figure 3C:
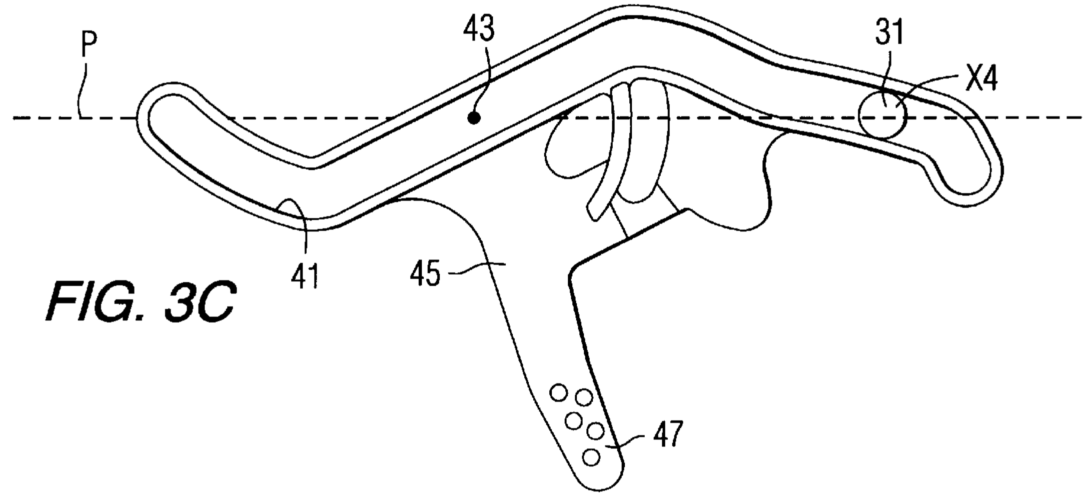

As the operator continues to move the handle 14 in the forward direction, the second cam follower 41 eventually moves to position X3, as represented in FIG. 3B. However, this requires movement of the second pivotable member 45 as shown. It rotates in conjunction with the rotation of the second cam track 41 about point 43. Movement of arm 47, which is connected to the second actuator, causes the second actuator to change the throttle position of the engine because of the movement of the second actuator. In other words, the cable which is attached to the arm 47 moves within its sheath 53 in order to change the throttle position. Further movement of the second cam follower 31 to position X4, as shown in FIG. 3C, requires further rotation of the second pivotable member 45 about its pivot point 43. This, in turn, results in further movement of arm 47 in conjunction with the rotation of the second pivotable member 45 and the second cam track 41. During the movement of the second cam follower from position X1 to position X4, as represented in FIGS. 3A–3C, the second cam follower 31 remained on path P and the second pivotable member 45 rotated about point 43 to accommodate this coordinated movement. Therefore, movement of the handle 14 to cause the second cam follower 31 to move sequentially through positions X1, X2, X3, and X4, causes the second pivotable member 45 to rotate about point 43 and affect the throttle position of the engine.

The distinctive shape of the second cam track 41 shown in FIGS. 3A–3C can be determined by one skilled in the art of cam mechanism design by first determining the desired relationship between the movement of the handle 14 and the movement of the second actuator 51. For example, when the second cam follower 31, which is attached to the handle 14 is at a particular position along path P, the desired position of the arm 47 and the second actuator 51 is determined. That degree of rotation of the second pivotable member 45 is used to determine the necessary position of the second cam track 41. In other words, the arcuate distance between the position X3 in FIG. 3A and dashed line P must define an angle that is equal to the desired angle when the second cam follower 31 reaches that position along path P. By using a plurality of positions along the full range of travel of the second cam follower 31 along path P, the required positions of the cam track 41 can be defined. These required positions of the cam track can then be connected with a smooth line to define the resulting shape of the second cam track 41.

Figure 4A:
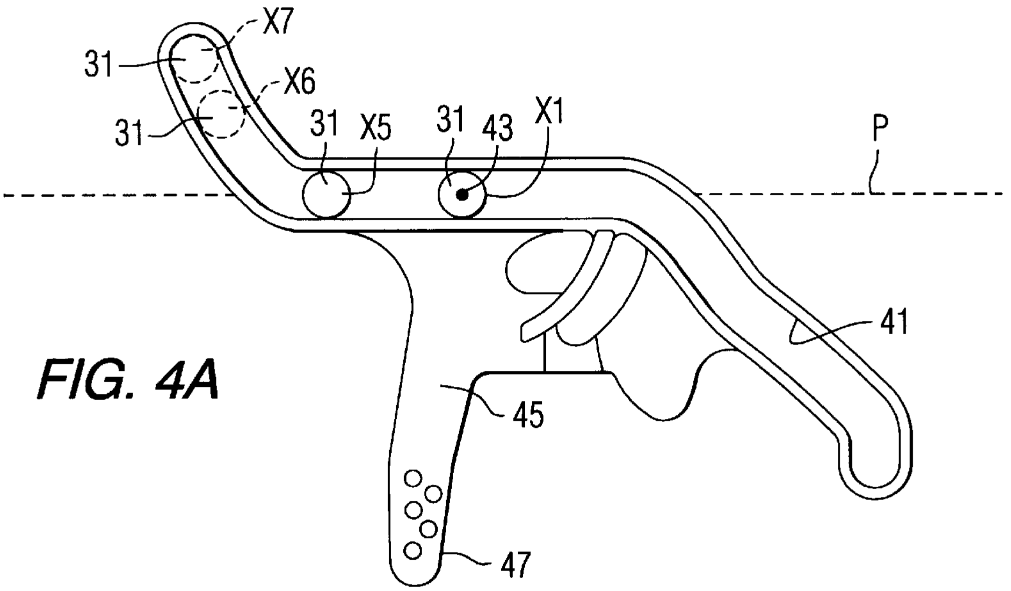
FIGS. 4A, 4B, 4C show the relative movements of the cam follower and cam track when the mechanism is operated in reverse gear.
Figure 4B:
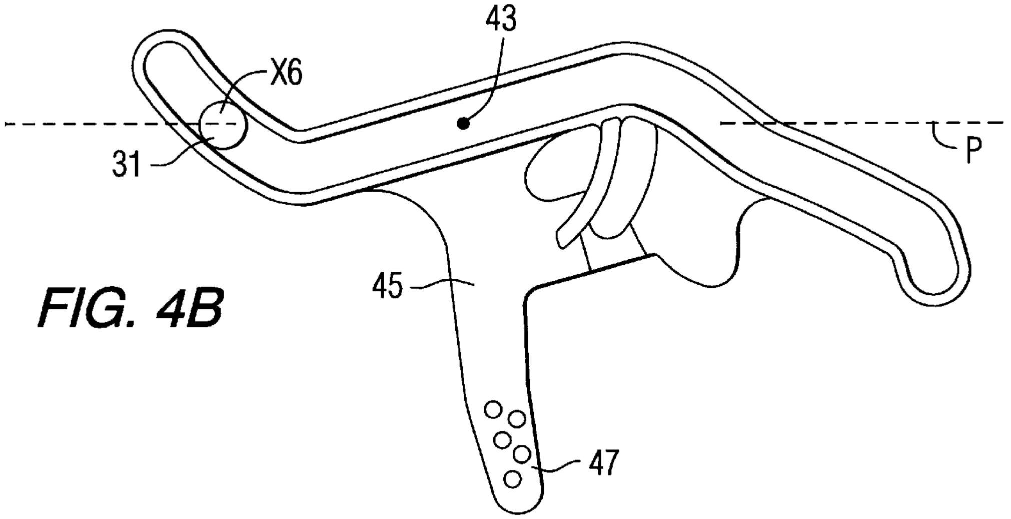
Figure 4C:
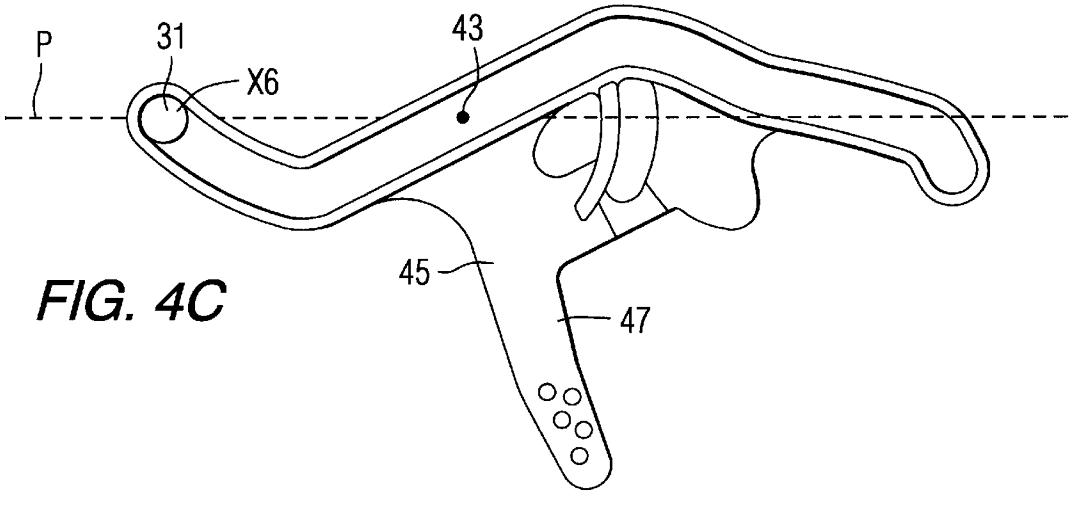

The movement described above in conjunction with FIGS. 3A–3C represents the way in which the present invention responds to movement of the handle 14 when it is moved in the forward direction. The same handle 14 is used to move in a reverse direction, when the transmission is in reverse gear, to regulate the throttle position. FIGS. 4A–4C describe that process.

In FIG. 4A, the second cam follower 31 is at position X1 coincident with the pivot point 43. It can move to position X5 without requiring any rotation of the second pivotable member 45 because positions X1 and X5 are both on path P which is represented by the dashed line in FIG. 4A. However, if the second cam follower 31 is moved to position X6, the second pivotable member 45 must rotate about point 43 because the second cam follower 31 must remain on path P as represented in FIG. 4B. This is necessary because, as illustrated in FIG. 4A, position X6 is not on line P unless the second pivotable member rotates about its pivot point 43 by some angle. Further movement of the second cam follower 31 toward the left in FIGS. 4A–4C results in the second cam follower moving to location X6 as represented in FIG. 4C. This causes further rotation of the second pivotable member 45 and its arm 47 about point 43.

With continued reference to FIGS. 3A–3C and FIGS. 4A–4C, it can be seen that counterclockwise rotation of the second pivotable member 45 increases the throttle setting of an engine. This throttle setting is increased if the handle 14 is moved away from its neutral position in either the forward or reverse direction. This can be seen by comparing FIGS. 3B and 4B or FIGS. 3C and 4C. Even though the second cam follower 31 is being moved in opposite directions away from point 43 in these two sets of Figures, the result is the counterclockwise rotation of the second pivotable member 45 to increase the throttle either in the forward direction or the reverse direction, depending on the selection made by the operator.

It should be realized that the first cam track 40 and the first pivotable member 44, as illustrated in FIG. 1A, are moving coincidently with the movement described immediately above in conjunction with FIGS. 3A–3C and FIGS. 4A–4C. As a result, the gear shift selection made by the movement of the handle 14 in either the forward or reverse direction is coincident with the selection of engine speed. Both of the pivotable members, 44 and 45, are caused to rotate simultaneously with the linear movement of the handle 14 along path H.

With continued reference to FIGS. 3A–3C and FIGS. 4A–4C, it should be noted that the unique shape of the second cam track 41 defines the relative movement of the arm 47 as a function of movement of the handle 14. During some portions of the travel of handle 14, the arm 47 moves faster than during other portions. This results from the shape from the second cam track 41. Similarly, the first cam track 40 is shaped to move the transmission into and out of either reverse and forward gears at a rate defined by the shape of the first cam track 40. Depending on the type of boat and propulsion unit used in conjunction with the present invention, the first and second cam tracks can be uniquely shaped to take advantage of the characteristics of the boat and propulsion systems.

The present invention is typically used in conjunction with a control mechanism that exhibits several other features. One of those features relates to the provision of an additional lever (not shown) that allows the operator to manually increase the throttle only when the present invention is in neutral gear position. In the preceding description of the present invention, it can be seen that the second pivotable member 45, which controls the throttle, is moved in coordination with rotation of the first pivotable member 44, which controls the gear setting. In certain typical situations, it is desirable that the operator be provided with a means to increase the throttle setting without changing the gear selection from neutral position. This is commonly provided in known remote control mechanisms. In the present invention, the additional lever is provided and mounted for rotation relative to the support structure 10. This lever can be rotated only if the handle 14 is in the neutral position. In order to accommodate this limitation, the first pivotable member 44 is forced to move, in a direction perpendicular to the plane of FIG. 1A, into a slot when the handle 14 is in the neutral position. This allows the additional lever to move the second pivotable member 45 about its pivot point 43 without the requirement that the second cam follower 31 move along path P. In other words, when the second cam follower 31 is disposed coincident with the pivot point 43, the second pivotable member 45 is free to rotate about pivot point 43 without the need to move the handle 14. This allows the additional throttle lever to be used by the operator while the handle 14 is in the neutral position. In addition, it should be understood that the handle 14 can not be moved away from the neutral position as long as the additional throttle lever is moved away from its position of minimum throttle setting. This mechanism is not described in detail herein since most skilled artisans in the field of remote control mechanisms are aware of these throttle controls that are usable only when the transmission is in neutral. The purpose of a throttle control, such as the additional lever described above, is to allow the operator to increase the engine speed while the transmission is in neutral for the purpose of warming the engine after initial start-up.

When the control member 12 is moved by the operator to a position away from its neutral position, it is sometimes beneficial to provide a means that holds the control member 12 in its position after the operator releases the handle 14. In the present invention, a detent ball 300 is provided on the control member 12 and spring loaded in a direction away from the plane of the figure in either FIGS. 1A or 1B. In other words, two detent balls 300 can be provided. Although not shown in detail in the figures, a series of teeth or grooves can be provided in the internal surface of the support structure 10 along a line traveled by the detent ball 300. For example, the grooves or teeth can be provided in the region identified by reference numeral 310. The detent ball 300 would move into and out of each of the grooves 310 to hold the control member 12 in position when the handle 14 is released by the operator. This detent mechanism is used to hold the handle 14 in position when released by the operator even though some spring force might exist on the cable of either the first or second actuators. In certain circumstances, where more detent force is beneficial, the wheels, 26–29, can be attached to the control member 12 in such a way that they each rotate only in a single preferred direction of rotation about their respective axes. As a result, an intentional misalignment of the control member 12 with respect to surfaces 20–23 will place the wheels in contact with surfaces in a manner that further resists any movement that could be caused by spring tension on the cables. In other words, the wheels would move into contact with the respective surfaces in a manner opposite to the permitted rotation of the wheels. As a result, the wheels would not rotate and the resulting friction between the wheel surfaces and the surfaces, 20–23, would provide a further resistance to the movement of the control member 12 when the operator releases the handle 14. Naturally, when the operator again grips the handle 14 and moves it along path H, the control member 14 would no longer be misaligned and the wheels would be free to pass between the opposing ones of surfaces 20–23.

With reference to FIG. 1B, it can be seen that the handle 14 is also provided with a neutral release button 400 and a trim control button 410. The neutral release button 400 is provided to require the operator to depress the button 400 prior to moving the control member 12 out of the neutral gear position.

The present invention provides a remote control mechanism that allows the operator to move a handle 14 along a generally linear path to select both a gear setting and the throttle setting for a marine propulsion system. The generally linear motion of the control member 12 which is attached to the handle 14 is translated into a rotational motion of both first and second pivotable members, 44 and 45, which are rotated in response to rotation of first and second cam tracks, 40 and 41, because first and second cam followers, 30 and 31, attached to the control member 12 are retained in the cam tracks. The resulting rotational movement of the first and second pivotable members, 44 and 45, cause control arms, 46 and 47, to move and affect first and second engine parameters. This is accomplished by attaching first and second actuators, 50 and 51, to their respective arms, 46 and 47. The first actuator can be connected to a gear selector and the second actuator can be connected to a throttle selector.

The present invention provides a remote control mechanism that results in less operator fatigue because of the linear movement of the handle 14. In addition, it provides a remote control mechanism that allows easy configuration of the first and second cam tracks, 40 and 41, to specifically define the relationships between the movement of the handle 14 and the movement of both the gear selector and throttle selector. This precise relationship of the gear selector and throttle selector movement is achieved by defining and selecting the shape of the first and second cam tracks, 40 and 41.

Although the present invention has been described with particular specificity and illustrated to show a preferred embodiment of the present invention, it should be understood that other embodiments are also within its scope. For example, the cam mechanism illustrated in the figures and described above places the cam followers, 30 and 31, on the control member 12 and places the first and second cam tracks, 40 and 41, on first and second pivotable members, 44 and 45. It should be clearly understood that reversing this arrangement can also result in the advantages of the present invention. In other words, a control member 12 can be attached to a pair of cam tracks which, in turn, move a cam follower relative to the support structure 10 to affect the first and second parameters of the engine. Although this embodiment is not illustrated in the figures or described in detail above, one skilled in the art could easily understand how a first and second cam mechanism could be connected to the control member and to the first and second actuators to achieve this result. Therefore, although the present invention has been described in detail in the preceding description, it should be clearly understood that other alternative embodiments are within its scope.

We claim:

1. A remote control mechanism, comprising:

a support structure;

a control member which is movable relative to said support structure;

a first cam track which is rotatable, about a first axis, relative to said support structure;

a first cam follower, attached to said control member, which is movable along a first linear path and contained within said first cam track; and a first actuator for affecting a first parameter of an engine, said first actuator being attached for movement with said first cam track relative to said support structure in response to rotation of said first cam track relative to said support structure, whereby movement of said control member relative to said support structure moves said first cam follower along said first path which causes said first cam follower to move relative to said first cam track and thereby rotate relative to said support structure to move said first actuator relative to said support structure.

2. The remote control mechanism of claim 1, further comprising:

a second cam track which is rotatable, about a second axis, relative to said support structure;

a second cam follower, attached to said control member, which is movable along a second path and contained within said second cam track; and a second actuator for affecting a second parameter of said engine, said second actuator being attached for movement with said second cam track relative to said support structure in response to rotation of said second cam track relative to said support structure, whereby movement of said control member relative to said support structure moves said second cam follower along said second path which causes said second cam follower to move relative to said second cam track and thereby rotate relative to said support structure to move said second actuator relative to said support structure.

3. The remote control mechanism of claim 1, wherein:

said first parameter of said engine is a gear shift position.

4. The remote control mechanism of claim 2, wherein:

said second parameter of said engine is a throttle position.

5. The remote control mechanism of claim 1, wherein:

said engine is an internal combustion engine of an outboard motor.

6. The remote control mechanism of claim 1, wherein:

said engine is an internal combustion engine of a stern drive marine propulsion system.

7. The remote control mechanism of claim 1, further comprising:

a first pivotable member which is rotatable, about a first axis, relative to said support structure, said first cam track being rigidly attached to said first pivotable member, said first actuator being attached to said first pivotable member.

8. The remote control mechanism of claim 2, further comprising:

a second pivotable member which is rotatable, about a second axis, relative to said support structure, said second cam track being rigidly attached to said second pivotable member, said second actuator being attached to said second pivotable member.

9. The remote control mechanism of claim 2, wherein:

said first and second cam followers rotate about a common axis.

10. The remote control mechanism of claim 2, wherein:

said second path is linear.

11. The remote control mechanism of claim 1, wherein:

said first actuator is a first cable having a first end attached to move with said first cam track and a second end attached to a gear shift mechanism of said engine, said first cable being disposed within a sheath which is attached to said support structure.

12. The remote control mechanism of claim 2, wherein:

said second actuator is a second cable having a first end attached to move with said second cam track and a second end attached to a throttle mechanism of said engine, said second cable being disposed within a sheath which is attached to said support structure.

13. The remote control mechanism of claim 2, wherein:

said first and second cam followers are portions of a common structure.

14. A remote control mechanism for a marine propulsion system, comprising:

a support structure;

a control member which is movable along a linear path relative to said support structure;

a first cam mechanism connected to said control member and to a first actuator for affecting a first parameter of an engine, whereby movement of said control member relative to said support structure moves said first actuator relative to said support structure; and a second cam mechanism connected to said control member and to a second actuator for affecting a second parameter of said engine, whereby movement of said control member relative to said support structure moves said second actuator relative to said support structure.

15. The remote control mechanism of claim 14, wherein:

said first parameter of said engine is a gear shift position and said second parameter of said engine is a throttle position.

16. The remote control mechanism of claim 15, wherein:

said first actuator is a first cable having a first end attached to move with said first cam track and a second end attached to a gear shift mechanism of said engine, said first cable being disposed within a sheath which is attached to said support structure and said second actuator is a second cable having a first end attached to move with said second cam track and a second end attached to a gear shift mechanism of said engine, said second cable being disposed within a sheath which is attached to said support structure.

17. A remote control mechanism, comprising:

a support structure;

a control member which is movable relative to said support structure;

a first cam track which is rotatable, about a first axis, relative to said support structure;

a first cam follower, attached to said control member, which is movable along a first path and contained within said first cam track;

a first actuator for affecting a first parameter of an engine, said first actuator being attached for movement with said first cam track relative to said support structure in response to rotation of said first cam track relative to said support structure, whereby movement of said control member relative to said support structure moves said first cam follower along said first path which causes said first cam follower to move relative to said first cam track and thereby rotate relative to said support structure to move said first actuator relative to said support structure;

a second cam track which is rotatable, about a second axis, relative to said support structure;

a second cam follower, attached to said control member, which is movable along a second path and contained within said second cam track;

a second actuator for affecting a second parameter of said engine, said second actuator being attached for movement with said second cam track relative to said support structure in response to rotation of said second cam track relative to said support structure, whereby movement of said control member relative to said support structure moves said second cam follower along said second path which causes said second cam follower to move relative to said second cam track and thereby rotate relative to said support structure to move said second actuator relative to said support structure.

18. The remote control mechanism of claim 17, wherein:

said first path is linear, said first parameter of said engine is a gear shift position, said second parameter of said engine is a throttle position.

19. The remote control mechanism of claim 18, wherein:

said first actuator is a first cable having a first end attached to move with said first cam track and a second end attached to a gear shift mechanism of said engine, said first cable being disposed within a sheath which is attached to said support structure; and said second actuator is a second cable having a first end attached to move with said second cam track and a second end attached to a gear shift mechanism of said engine, said second cable being disposed within a sheath which is attached to said support structure.

* * * * *